Dec. 17, 1968  I. MICHALKO  3,416,964
FUSION-SEALED METAL-ENCLOSED RECHARGEABLE BATTERY CELLS
Filed Jan. 17, 1966
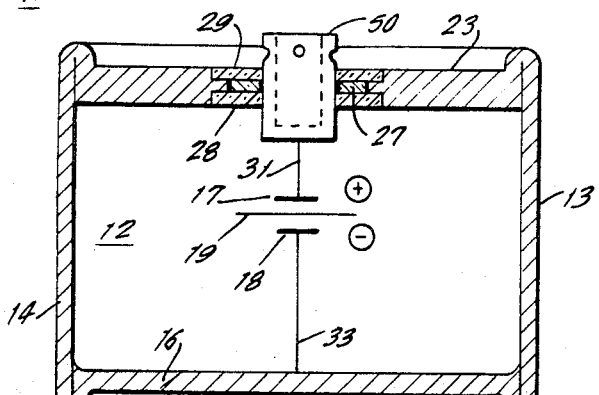
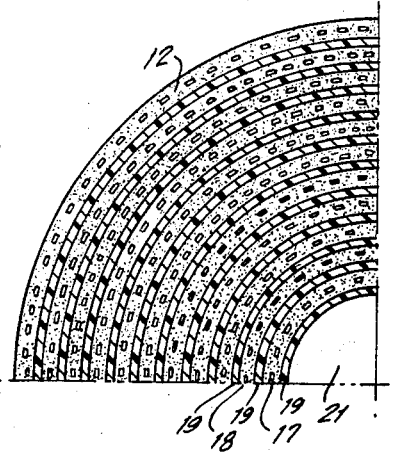
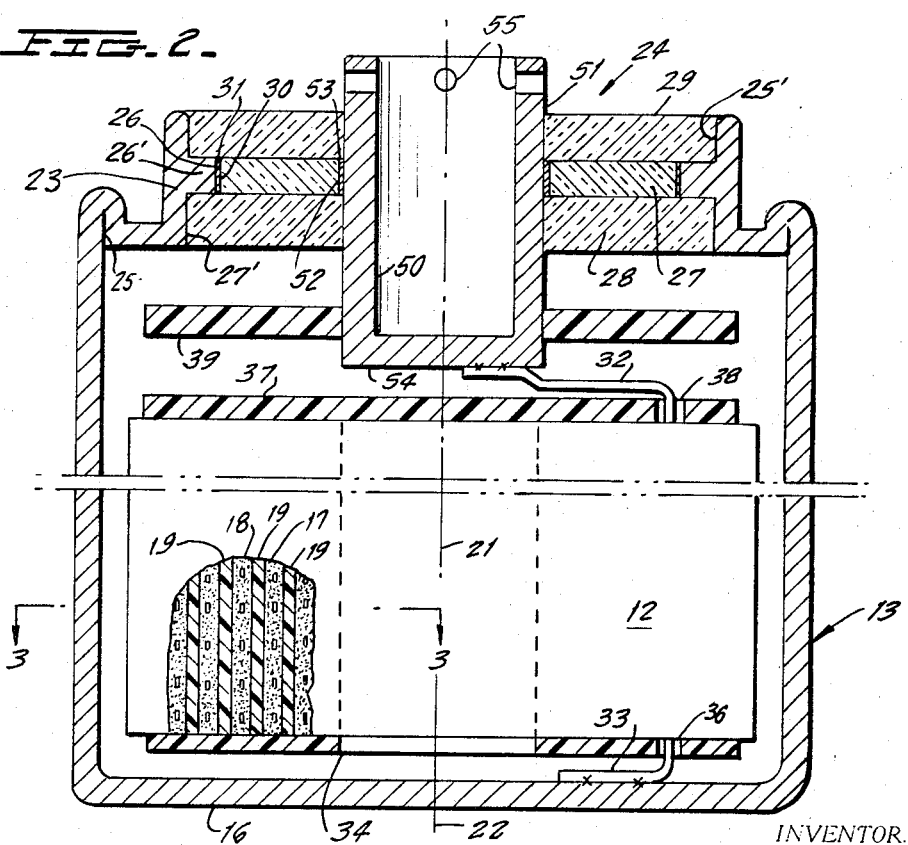
INVENTOR.
IGNATIUS MICHALKO
BY
OSTROLENK, FABER, GERB & SOFFEN
ATTORNEYS United States Patent Office 3,416,964
Patented Dec. 17, 1968

3,416,964
FUSION-SEALED METAL-ENCLOSED RE-
CHARGEABLE BATTERY CELLS
Ignatius Michalko, Ossining, N.Y., assignor to Sonotone
Corporation, Elmsford, N.Y., a corporation of New
York
Continuation-in-part of application Ser. No. 478,813,
Aug. 11, 1965. This application Jan. 17, 1966, Ser.
No. 521,007
3 Claims. (Cl. 136—6)

ABSTRACT OF THE DISCLOSURE

A sealed metallic casing of a rechargeable battery cell has a metallic terminal connected at least to one of the enclosed electrodes and spaced and joined by an insulating ceramic from a surrounding casing passage. The ceramic collar has two spaced metallic coatings affixed with tight metallic fusion joints to the surrounding casing passage and to a section of the surrounded terminal. A more inward glass sealing member overlaps the inward surfaces of the ceramic collar and its two-spaced metallic coatings and fusion joints and is sealed with two spaced glass-fusion joints to more inward overlapping surfaces of the metallic casing and the passing terminal to suppress electrolyte passage to the ceramic collar metal seals. The seal may include a more outward glass sealing member similarly overlapping the outward surfaces of the ceramic collar and similarly fused to more outward surfaces of the terminal and its surrounding metal casing surfaces. The casing opening is formed by a transverse strong casing neck having a lateral rib to suppress deformation thereof and of its composite seals by abnormal forces.

---

My invention relates to an improved terminal seal for metal-encased hermetically sealed rechargeable electric battery cells, and is a continuation-in-part of my copending U.S. patent application Ser. No. 478,813 filed Aug. 11, 1965 and entitled Rechargeable Battery Cell.

As is well known, sealed rechargeable battery cells, such as nickel cadmium batteries, include at least one pair of porous, opposite polarity electrodes containing active electrode substances and separated by a porous insulating layer. The pores of the electrodes and of the insulating layer contain a corrosive alkaline electrolyte. In certain critical applications, the opposite-polarity cell electrodes are respectively connected to the metallic casing and to a separate metallic terminal insulatingly sealed with metallic fusion seals of a ceramic insulator and carried within a portion of the casing.

One of the difficulties that have been encountered in the past with such ceramic cell seals under ambient extremes has been the deterioration of the ceramic-metal fusion seals by the corrosive electrolyte of the enclosed electrode assembly. One type of such prior sealed cell is described in U.S. Patent 3,064,065, filed by Louis Belove.

A solution to this problem is proposed in my above-noted copending parent application Ser. No. 478,813, in which an alkali-resistant glass layer overlaps and is fused to the metal-coated juncture regions of the ceramic collar exposed to the electrolyte. The present structure relates to a further improvement of dimensioning and locating the principal ceramic and protective glass seals, to provide a multiple seal of increased ruggedness and ability to withstand severe ambient extremes.

In accordance with the invention, access or penetration of the corrosive electrolyte to the metallic sealing junction surfaces of the ceramic insulating collar about the metallic terminal member is suppressed or eliminated by a more-inward insulating glass sealing collar overlapping the interior surfaces of the ceramic collar and its two metallic fusion-sealed junctions, with the inward glass collar joined by gas-tight glass fusion seals to regions of the metallic terminal and casing wall portion adjoining the two ceramic-collar metallic fusion seals.

Further, in accordance with the invention, the outward face of the ceramic insulating collar with its two metallic fusion seals is overlapped by a more outward second glass insulating collar which is similarly joined by glass-fusion seals to more outward portions of the terminal member and the casing wall adjoining the two ceramic-collar metallic fusion seals. This outward glass seal serves also to balance the stack of sealing members, thereby increasing the strength of the sealing assembly.

A significant feature of the invention is the fact that the glass fusion seals are formed at a lower fusion temperature than that necessary for the primary metallic fusion seals between the ceramic collar and the respective mating surfaces of the casing aperture surface and of the terminal member held therein. Thus, the auxiliary glass seals may be conveniently formed after the primary ceramic-collar metal-fusion seals are made without disturbing the gas pressure-resistant properties of these primary seals.

It is, therefore, a primary object of the instant invention to provide an improved sealing arrangement for protecting the metallic fusion sealing layers of a primary ceramic seal from electrolytic deterioration.

A further object of the instant invention is to provide such a sealing arrangement which includes a protective body of solidified molten glass, located within the coaxial spacing immediately adjacent the inward longitudinal end of the ceramic collar, and interposed between the inwardly facing regions of the metallic fusion layers, and also overlapping the adjoining metallic surface region of the casing.

Another object of my invention is to provide a sealing assembly for a battery seal, which includes a stacked plurality of individual sealing members, longitudinally arrayed between the internal volume of the cell and the external region of the cell cover.

A further object of my invention is to provide such a sealing assembly, which includes a ceramic collar, having its insulatingly spaced opposed juncture surfaces metal-fused to the longitudinally adjacent end walls of the terminal member and cover opening, with such collar member interposed between a pair of glass fusion seals.

Still an additional object of my invention is to provide within a battery cell having an annular sealing region between a terminal cover opening and a terminal member, a longitudinally adjacent array of: a first glass fusion annular seal; an intermediate primary seal formed of a ceramic collar which is metal-fused to the opposed longitudinally intermediate walls of the terminal opening and terminal means; and a second glass fusion annular seal.

Still a further object of my invention is to provide such a sealing assembly within a rechargeable battery cell, wherein the material of the glass fusion seal has a lower fusion temperature than required to form the fusion surfaces of the primary ceramic collar seal.

The nature of the present invention and its various advantages and features are set forth more fully in the following detailed description of an illustrative embodiment thereof taken in connection with the appended drawing, in which:

FIG. 1 is a diagrammatic representation, partially in cross-section, of one form of alkaline-type rechargeable battery cell in accordance with the invention;

FIG. 2 is a sectional elevation of one form of battery cell, in accordance with FIG. 1;

FIG. 3 is a fragmentary sectional view, on a greatly enlarged scale, taken along line 3—3 of FIG. 2.

Referring now to the drawing, FIG. 1 depicts a sealed battery cell employing the principles of the present invention. The battery 11, which illustratively comprises a nickel-cadmium cell operating with an alkaline electrolyte, includes an electrode assembly 12 mounted within a metallic casing 13. The casing 13 is formed from a suitable alkali-resistant material, such as nickel coated, cold-rolled sheet steel or stainless steel, with the nickel coating applied before or after cell assembly. Casing 13 includes a tubular side wall 14 and an integral bottom wall 16. The electrode assembly 12 consists of at least one pair of superposed electrode plates 17 and 18 of opposite polarity separated by an electrically insulating separator sheet or layer 19. The electrodes 17 and 18 and the separator 19 are made porous for the purpose of absorbing and immobilizing the alkaline electrolyte within the electrode assembly 12. Although the battery cell 11 may operate with any known form of electrode assembly (for instance a stack of vertically superposed electrode plates of alternating polarity), the electrode assembly 12 is illustratively in the form of a spiral coil (FIGS. 2 and 3).

The spirally coiled electrodes 17 and 18 of the electrode assembly 12 are in the form of sintered plates, the pores of which are suitably loaded with active electrode substances described, may be of the general type described in U.S. Patent No. 2,702,212 and in the article "Nickel Cadmium Battery Plates" published Dec. 6, 1948 in the Journal of the Electro-Chemical Society, vol. 94, No. 6, pp. 289–299. The active electrode substance for the positive electrode plate 17 consists of a first form of nickel hydroxide $Ni(OH)_2$ which, when fully charged, is converted into a second form of nickel hydroxide $NiO(OH)$ in which nickel is present in a higher oxidation state. The active electrode substance for the negative electrode plate 18 consists of cadmium hydroxide $Cd(OH)_2$ which, when fully charged, is converted into metallic cadmium. The electrolyte employed in cells of this type typically comprises a 20 to 30 percent (by weight) solution of potassium hydroxide in water.

As shown in FIGURE 2, the coiled electrode assembly 12 has a hollow central passage 21 and is designed to fit tightly within the space enclosed by the side wall 14 and the bottom wall 16 of the cell casing 13. The axis of the coiled electrode assembly 12 is generally coaxial with the axis 22 of the casing 13.

The casing 13 is also provided with an integral top wall or cover 23, fused or welded to the surrounding casing edge in the general manner fully discussed in above-referred to U.S. Patent No. 3,064,065. The metallic cover wall 23 has a centrally disposed circular aperture 24. The cover opening 24 is of a generally cylindrical configuration, including longitudinally adjacent cylindrical wall surfaces 27', 26 and 25', with intermediate wall surface 26 being at the end of inwardly extending shoulder 26'. Disposed within the aperture 24 is an elongated tubular metal terminal member 50 having a cylindrical wall surface 51 longitudinally coextensive with the wall surfaces 27', 26, 25' of the terminal opening and space separated therefrom to define a sealing region which accommodates the multi-seal assembly 27, 28, 29 of the instant invention. The terminal member 50 may typically be formed of a nickel-iron alloy containing 50% nickel and 50% iron, or of a nickel-cobalt alloy, which is distributed under the trade name "Kovar." The terminal member which extends through aperture 24 in the top wall 23 to the interior of the cell 11 is shown having transverse apertures 55 about its circumference, which may typically receive circuit connecting means (not shown) such as wires, for connection of the cell terminal 50 to the external circuitry powered by the battery.

The positive and negative electrode plates 17 and 18 of the battery cell 11 are respectively connected to the insulated terminal member 50 and to the metallic casing 13. In the form shown, the positive electrode plate 17 is connected to the terminal member 50 by means of a first strip or tab 32 spot-welded to an inner wall surface 54 of the terminal member. Similarly, the negative electrode plate 18 is connected to the casing 13 by means of a second strip or tab 33 spot-welded to the bottom wall 16 of the casing.

The tab 33 is insulated from the positive electrode 17 at the bottom end of the electrode assembly 12 by means of a first insulating sheet 34, typically of nylon, which contains an aperture 36 through which tab 33 passes. Similarly, tab 32 is insulated from the negative electrode 18 at the top of the electrode assembly 12 by a second insulating sheet 37 containing an aperture 38 through which tab 32 passes. In addition, a third apertured nylon sheet 39, typically of split ring construction, is disposed around the inwardly projecting portion of terminal member wall surface 51, to insulate the tab 32 from the metallic top wall 23 of the casing 13.

A detailed consideration will now be directed to the multiple member sealing assembly which constitutes the subject matter of the instant invention. An intermediate length of the sealing region intermediate the wall surfaces of opening 24 and the wall surface 51 of terminal member 50 includes a primary seal formed of collar member 27. Collar member 27 is of a longitudinal extent less than the longitudinal extent of the overall sealing region and equal to the length of inwardly extending shoulder 26', collar member 27 includes insulatingly spaced juncture surfaces 30, 52 in juxtaposition with respect to inwardly stepped wall surface 26 of the aperture opening 24 and an intermediate region of the terminal wall surface 51. The collar 27 is formed from high density, liquid-and-gas-tight ceramic material which may be of the type similar to that used in making gas-tight envelopes for vacuum tubes. In particular, the material of the collar 27 is designed to have high resistance to corrosion by the alkaline electrolyte of the cell 11. As an example, good results are obtained with the use of ceramic material consisting of high density, fired and matured ceramic solids containing 94 to 96 percent of alumina or aluminum oxide. Good results are also obtained with ceramic material consisting principally of zircon, a combination of zircon and alumina, or of steatite of the type described in U.S. Patent No. 2,912,340.

The outer circumferential surface 30 of ceramic collar 27 is metallically coated and joined by a first gas-tight metallic junction layer 31 to the longitudinally adjacent intermediate wall surface 26 of aperture 24 in the top wall 23. In like manner, the inner circumferential surface 52 of ceramic collar 27 is metallically coated and joined by a second gas-tight metallic junction layer 53 to the longitudinally adjacent region of the outer wall surface 51 of the terminal member 50. Any suitable process for forming fused metallic seals between a ceramic body and an adjacent metal body may be used in forming the junctions 31 and 53. For instance, in one process (known in the industry as the "Telefunken" process), a thin coating of fine metallic powder consisting of molybdenum with manganese is applied to the inner and outer circumferential juncture surfaces 30 and 52 of the ceramic collar 27. The metallic powder is held in a suitable coating medium such as nitrocellulose lacquer. The coated ceramic collar 27 is then heated for a half hour at 350° C. in a protective atmosphere of nitrogen wherein the applied molybdenum-manganese mixture forms homogeneous metallic strata on the surfaces 30 and 52.

Alternatively, in the so-called "Bondley" process, the metallized strata on the surfaces 30 and 52 is formed either with titanium hydride or with zirconium hydride. As an example, fine titanium hydride powder is first mixed with a suitable binder such as nitrocellulose lacquer, and is then applied as a thin coating to the inner and outer surfaces 30 and 52. The ceramic collar 27 is then heated to a temperature in the range of 1100° C. to 1300° C. under vacuum, whereupon the titanium hydride decomposes and its titanium content forms a metallic stratum on each of the surfaces 30 and 52 in the presence of pure hydrogen evolved by the hydride.

The metallic surface strata deposited on the surfaces of the ceramic collar 27 by any of the above-mentioned processes are then respectively joined by a suitably brazing metal to the metallic periphery 26 of the aperture 24 and to the outer metallic surface 51 of the terminal member 50. The brazing composition employed may advantageously consist of a eutectic alloy of nickel and gold, or silver-solder composition.

While the resulting metallic fused junctions 31 and 53 are generally liquid-tight as well as gas-tight, it has been found that the me allized strata on the surfaces 30, 52 of the ceramic collar 27 may be attacked and corroded by the alkaline electrolyte employed in the battery cell 11. This corrosion eventually destroys the fusion seals 31, 53 and thus the usefulness of the cell 11.

A pair of alkaline resistant glass fusion seals 28, 29 are then formed in the annular sealing regions at the opposed ends of ceramic collar 27, so as to provide the stacked assembly of sealing members 28, 27, 29; with the primary seal of collar 27 interposed between the glass seals 28, 29. Glass seal 28 is formed of a suitable material which will offer significantly more resistance to the corrosive effect of the alkaline electrolyte than the metallic fusion seals 31, 53; and hence will serve as a protective barrier against the corrosive deterioration of metal fusion surfaces 31, 52. Glass seal 29 may preferably be formed of the same material, so as to serve a backup function to prevent any small amount of electrolyte which might leak past seal members 28, 27 from leaving the cell.

Glass seals 28, 29 are preferably formed by fusing layers of pulverized or granulated gas-tight glass that are placed around the periphery of its annular recesses. It has been found that seals 28, 29 formed from borosilicate glass such as that distributed under the trade name "Corning 9010," or other alkali-resistant glass which has a melting temperature significantly below that of the fused metallic junctions 31, 53, provide adequate protection against alkaline corrosion without destroying the gas pressure-resistant properties of the primary fusion seals 31, 53. Advantageously, the pulverized glass layers 28, 29 are applied after the metallic fusion seals 31, 53 are formed, and the pulverized layers are then fused into alkali-resistant, liquid-tight seals at the opposed longitudinal ends of primary fusion seals 31, 53 in an oven (not shown) that is heated to a suitable temperature.

By providing a multiplicity of sealing layers intermedia e the inner volume of the casing and the external portion of the cover, the structure of the instant invention advantageously limits any fissures which may initiate in one of the layers from spreading to an adjacent layer and hence destroying the seal. That is, should the cover portion 23 tend to be bowed outwardly by pressure build-up within the cell, glass seal member 29 will be placed in tensile stress and opposed glass seal member 28 in compressive stress. Inasmuch as such glass materials usually can withstand compressive stresses better than tensile stresses, cracks may tend to develop in glass seal 29 under extreme conditions of deformation. If so, such cracks or fissures will be limited to that sealing member and will not impair the effectiveness of the successively adjacent primary seal 27 and glass seal protective barrier 28. Conversely, should a crack develop in glass seal 28 which is of a sufficient magnitude to permit electrolyte to pass therethrough and degrade the effectiveness of metal fusion surfaces 31, 53, the presence of glass seal 29 will prevent leakage of the electrolyte from the cell, thereby preserving its utility.

In the foregoing, this invention has been described in conjunction with a particular cell construction having a tubular metal casing of a configuration of use in such devices as conventional flashlights. It should be understood, however, that the present invention is applicable to sealed alkaline battery cells having cell casings and cover configurations of many shapes (oval, rectangular, or the like) as required in different specific applications. Further, although the multiple sealing assembly shown in the illustrative embodiment includes three layers, the general concept of a plurality of sealing layers encompasses various other arrangements, materials and numbers of individual sealing layers.

Since these and many other variations will now be obvious to those skilled in the art, it is intended that the invention herein is not limited by my specific disclosure but by the breadth of the appended claims.

The embodiments of the invention in which an exclusive privilege or property is claimed are defined as follows.

1. In a sealed, rechargeable alkaline battery cell:
   a metallic casing and an opposite polarity electrode assembly including alkaline electrolyte within said casing and having one electrode connected to said casing;
   said casing having a thick metallic wall section and an elongated passage within said wall section to the casing interior;
   an electrically conductive elongated terminal member located in said elongated passage, having an inward longitudinal end electrically connected to another polarity electrode of said electrode assembly, and an outward longitudinal end extending external of said casing wall section;
   said elongated terminal member being spaced from the surrounding interior passage surface of said casing wall section by a coaxial spacing of substantial length;
   a substantial length of said terminal member within said elongated passage being separated from the surrounding interior passage surface by a ceramic insulating collar within said coaxial spacing;
   said ceramic collar having an interior ceramic juncture surface facing a nearby exterior juncture surface of said terminal member and an exterior ceramic juncture surface facing a nearby passage juncture surface of said casing wall section;
   said interior and exterior ceramic juncture surfaces having first and second thin adherent metallic coatings respectively;
   first and second solidified metallic fusion sealing layers fusing the metallic coatings of said exterior and said interior ceramic juncture surface regions in juxtaposition relationship, respectively to said juncture surfaces of said terminal member and said casing passage wall section, and con. tituting two leak tight fusion seals at said two juxtaposed ceramic and metallic juncture surfaces;
   and in combination therewith, the improvement comprising:
       said casing wall section including an interiorly extending metallic shoulder longitudinally coextensive with the location of said ceramic collar, said interiorly extending shoulder substantially reducing the width of said coaxial spacing such that said coaxial spacing is of an appreciably greater width longitudinally beyond said ceramic collar;
       a protective body of solidified molten glass located within said coaxial spacing immediately adjacent the inward longitudinal end of said ceramic collar, and interposed between the inwardly facing regions of said first and second metallic fusion sealing layers, and also overlapping the adjoining metallic surface regions of said interiorly extending metallic shoulder and extending along the longitudinally inward wall surfaces of said terminal member within said coaxial spacing and the opposed casing pas age surface;
       said protective glass body having a melting temperature lower than the metal of said metallic fusion sealing layer and being fused to said inwardly facing regions of said two metallic fusion sealing layers and the nearby metallic surface portions of said casing wall passage surface and said shoulder, and the longitudinally inward wall surface of said terminal member coextensive therewith, and constituting barrier body forming an additional leak-tight fusion seal which also suppresses penetration of electrolyte from the casing interior to said two metallic fusion sealing layers.

2. In a sealed rechargeable cell, as claimed in claim 1: said glass body filling a substantial length of said coaxial space facing inward of the casing and cooperating with said ceramic collar in holding said terminal member affixed in leak tight relationship within said wall passage.

3. In a sealed rechargeable cell as claimed in claim 1: said improvement also comprising a further similar body of solidified molten glass located in and filling a substantial length of said coaxial spacing adjacent the outward end of said ceramic collar and the outwardly facing regions of said first and second metallic coatings of said two ceramic junction surfaces and said two leak tight metallic fusion layers, and also overlapping and fused to the adjoining metallic surface regions of said interiorly extending shoulder, and the longitudinally coextensive wall surfaces of said terminal member and casing passage;

said further glass body filling a substantial length of said coaxial passage longitudinally outward of said collar and constituting a further sealing body strengthening and supplementing said ceramic seal and said inward glass sealing body.

References Cited

UNITED STATES PATENTS

| | | |
|---|---|---|
| 3,064,065 | 11/1962 | Belove. |
| 2,508,354 | 5/1950 | Brinson _____ 287—189.365 |
| 3,049,792 | 8/1962 | Kohl _____ 65—59 |
| 3,083,249 | 3/1963 | Belove. |
| 3,142,886 | 8/1964 | Bronson et al. _____ 65—59 |
| 3,167,418 | 1/1965 | Hopkins et al. _____ 65—59 |
| 3,192,497 | 6/1965 | Bender et al. _____ 65—59 |

WINSTON A. DOUGLAS, *Primary Examiner.*

A. SKAPARS, *Assistant Examiner.*

U.S. Cl. X.R.

136—133